(No Model.)
H. HERBERT.
PHOTOGRAPHIC SHUTTER.
No. 400,084. Patented Mar. 26, 1889.
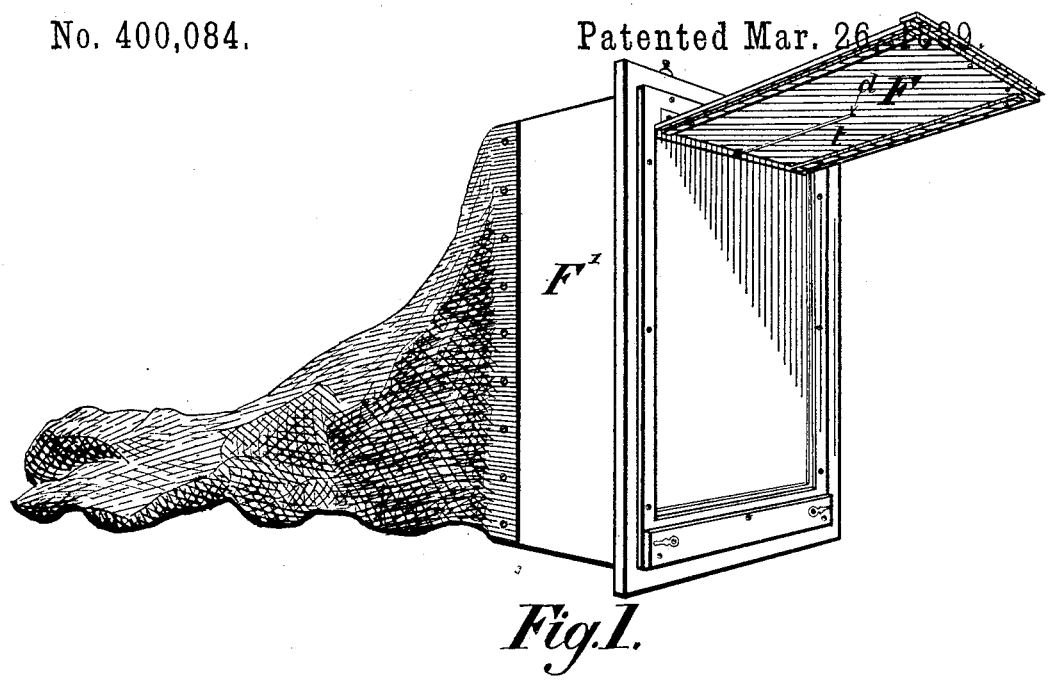
Fig. 1.
Fig. 2.
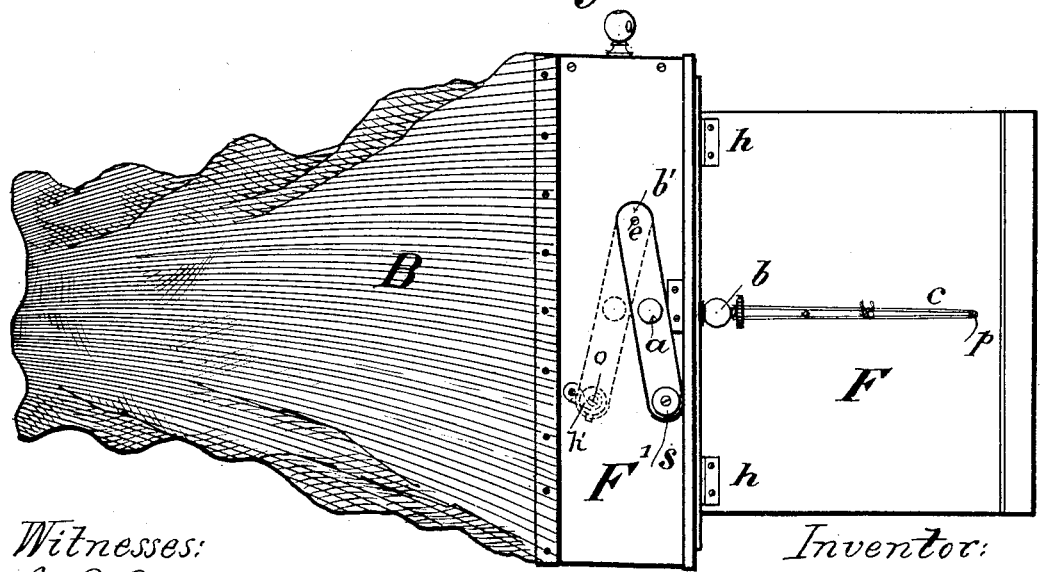
Witnesses:
E. R. Brown
E. L. Richards
Inventor:
Henry Herbert,
By Richards
Attorneys.

UNITED STATES PATENT OFFICE.

HENRY HERBERT, OF LONDON, COUNTY OF MIDDLESEX, ENGLAND.

PHOTOGRAPHIC SHUTTER.

SPECIFICATION forming part of Letters Patent No. 400,084, dated March 26, 1889.

Application filed January 4, 1889. Serial No. 295,394. (No model.) Patented in England October 10, 1888, No. 14,545.

*To all whom it may concern:*

Be it known that I, HENRY HERBERT, a subject of the Queen of Great Britain, residing at London, in the county of Middlesex, England, have invented a certain new or Improved Construction of Shutter for Photographic Apparatus, (for which I have previously obtained Letters Patent in Great Britain, dated October 10, 1888, No. 14,545,) of which the following is a full, clear, and exact description.

My invention relates to a new or improved construction of shutter for photographic and other apparatus, and is designed as a substitute for the sliding shutter hitherto used.

A shutter constructed according to my invention is arranged to move up and down on hinges fixed to the front and upper part of the photographic apparatus to which it is applied, and is kept normally open by means of a central spring, one end of which is fixed to a pin secured to the upper surface of the said shutter, while its other end is attached to the top of the frame of the apparatus. Upon the same top is arranged a small bar, of brass or other suitable material, moving at one extremity upon a pin or pivot, its other extremity carrying a stud provided with an attachment-screw in which is fixed the end of a cord or wire, whose other end passes around a pin-head fixed centrally upon the before-mentioned bar and through the frame, in order to be attached to a pin secured at the inner surface of the said shutter; and in order that my invention may be more fully understood I have shown the same in the accompanying drawings, in which—

Figure 1 is a perspective view of my improved shutter applied to a photographic frame or apparatus, and Fig. 2 is a plan of the same.

My improved shutter consists of a flap, F, fixed to the frame F' by means of hinges *h h*. In front of the frame and upon the upper edge thereof is placed a stud or button, *b*, to which is fixed one extremity of an india-rubber band or spring, *c*, whose other end is attached to a pin, *p*. Upon the under side of the flap or shutter F, Fig. 1, one end of a thread or cord, *t*, is attached to a pin, *d*, while its other end passes through the top of the frame F' and around the headed pin *a*, in order to be attached to the screw-stud *s*, both of which are mounted upon a bar, *b'*, pivoting upon a pin, *e*, likewise fixed on the top of the box or frame F'.

In order to close the flap or shutter F the screw-stud *s* is moved to the left-hand side in the position shown in dotted lines in Fig. 2 of the drawings, thereby pulling the thread *t*, and hence the flap, against its bearings. The stud *s* can be retained in that position by means of a small hook, *h'*, fixed on the frame F' and engaging with a pin, *o*, inserted in the top of the bar, *b'*. By releasing the screw-stud *s* the flap or shutter F is automatically opened under the action of the india-rubber band or spring *c*.

Having thus particularly described my invention, what I claim as new, and desire to secure by Letters Patent, is—

The improved shutter hereinbefore described, consisting of a hinged flap closed by a thread or cord which is fixed to and operated by a screw-stud attached upon a pivoting-bar, said flap opening automatically under the action of an india-rubber band or spring, for the purpose set forth.

H. HERBERT.

Witnesses:
 FRANK HUGHES,
 ALEXANDER JAMES ELI,
  *76 Chancery Lane, London, W. C.*